United States Patent
Barve et al.

(10) Patent No.: US 9,940,152 B2
(45) Date of Patent: Apr. 10, 2018

(54) METHODS AND SYSTEMS FOR INTEGRATING A VOLUME SHADOW COPY SERVICE (VSS) REQUESTER AND/OR A VSS PROVIDER WITH VIRTUAL VOLUMES (VVOLS)

(71) Applicant: HEWLETT PACKARD ENTERPRISE DEVELOPMENT LP, Houston, TX (US)

(72) Inventors: Anagha Barve, Sunnyvale, CA (US); Eric Forgette, Clarence, NY (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 34 days.

(21) Appl. No.: 14/804,273

(22) Filed: Jul. 20, 2015

(65) Prior Publication Data

US 2017/0024232 A1   Jan. 26, 2017

(51) Int. Cl.
 *G06F 9/455* (2006.01)
 *G06F 11/14* (2006.01)

(52) U.S. Cl.
 CPC ...... *G06F 9/45558* (2013.01); *G06F 11/1464* (2013.01); *G06F 2009/45583* (2013.01); *G06F 2201/84* (2013.01)

(58) Field of Classification Search
 None
 See application file for complete search history.

(56) References Cited

U.S. PATENT DOCUMENTS

| | | | | |
|---|---|---|---|---|
| 2010/0257326 A1* | 10/2010 | Otani | .................. | G06F 11/1451 711/162 |
| 2015/0153959 A1* | 6/2015 | Esaka | .................. | G06F 3/0619 711/114 |
| 2015/0370652 A1* | 12/2015 | He | ..................... | G06F 11/1435 714/19 |
| 2016/0034481 A1* | 2/2016 | Kumarasamy | .... | G06F 17/30088 707/639 |

OTHER PUBLICATIONS

Wood, "What's New in vSphere 6.0: Virtual Volumes", WoodITWork.com (Aug. 26, 2014), downloaded from http://www.wooditwork.com/2014/08/26/whats-new-vsphere-6-0-virtual-volumes/, 10 pgs.

(Continued)

*Primary Examiner* — Wynuel Aquino
(74) *Attorney, Agent, or Firm* — Ascenda Law Group, PC

(57) ABSTRACT

Described herein are techniques for configuring a volume shadow copy service (VSS) requester and/or VSS provider so that a snapshot may be taken of application data stored on a virtual volume (VVOL). The VSS requester may receive a request to take a snapshot of a VVOL, the VVOL identified by a VVOL identifier. The VSS provider associated with a storage array may determine whether the storage array supports taking the snapshot of the VVOL. The determination may be based on information derived from a mapping which maps respective VVOL identifiers to respective logical unit identifiers. If the VSS provider supports taking the snapshot of the VVOL, the VSS provider may take the snapshot of the VVOL.

12 Claims, 14 Drawing Sheets

(56) References Cited

OTHER PUBLICATIONS

Tech_OnTap, "NetApp Unlocks the Power of Vmware VVOLs", NetApp Community (Aug. 6, 2014), downloaded from http://community.netapp.com/t5/Tech-OnTap-Articles/NetApp-Unlocks-the-Power-of-VMware-VVOLs/ta-p/86939, 5 pgs.

"VMware Virtual Volumes on NetApp Clustered Data Ontap", NetApp, Solution Brief SB-3684-0415, 3 pgs.

"Implementing VMware Virtual Volumes on HP 3PAR StoreServ", Hewlett-Packard, Technical white paper 4AA5-6907ENW (Mar. 2015), Rev. 1, 28 pgs.

"HP Data Protector 6.2 software integration with HP 3PAR Storage System", Hewlett-Packard, Technical white paper 4AA3-4271ENW (Jun. 2011), 68 pgs.

Cormac, "More Virtual Volumes (VVols) and Snapshots goodness", CormacHogan.com (Mar. 20, 2015), downloaded from http://cormachogan.com/2015/03/20/more-virtual-volumes-vvols-and-snapshots-goodness/, 10 pgs.

Marks, "VMware's Virtual Volumes functionality would help solve storage management problems in virtualized environments. But, like Vladmir and Estragon endlessly waiting for Godot, we're still waiting for VVOLs", Network Computing (May 27, 2014), downloaded from http://www.networkcomputing.com/cloud-infrastructure/waiting-for-vmware-vvols/a/d-id/1269184?print=yes, 4 pgs.

"Best Practices Guide: VMware on Nimble Storage", Nimble Storage (Feb. 25, 2011), 15 pgs.

"Storage Management Using Windows Server™ 2003 and Windows® Storage Server 2003 Virtual Disk Service and Volume Shadow Copy Service", Microsoft Corporation (Aug. 2013), 23 pgs.

Barreto, "The Basics of the Volume Shadow Copy Service (VSS)", TechNet Blogs (Oct. 10, 2007), downloaded from http://blogs.technet.com/b/josebda/archive/2007/10/10/the-basics-of-the-volume-shadow-copy-service-vss.aspx, 5 pgs.

Cormac, "Vm Snapshots with VSS—Traditional versus VVols", CormacHogan.com (Mar. 31, 2015), downloaded from http://cormachogan.com/2015/03/31/vm-snapshots-with-vss-traditional-versus-vvols/, 11 pgs.

"Epping, ""VMware Storage APIs for VM and Application Granular Data Management"", Yellow-Bricks (Aug. 7, 2012), downloaded from http://www.yellow-bricks.com/2012/08/07/vmware-vstorage-apis-for-vm-and-applicationgranular-data-management/, 3 pgs.".

"VMware Virtual Volumes (VVOLs)—What it is and what to look for in storage implementations", Tintri (Aug. 24, 2014), downloaded from https://www.tintri.com/blog/2014/08/vmware-virtual-volumes-what-it-and-what-look-storage-implementations, 6 pgs.

Stewart, "VMware VVols: next-gen storage goes back to the future", The Virtual Storage Guy (Aug. 28, 2014), downloaded from http://purestorageguy.com/2014/08/28/vmware-vvols-next-gen-storage-goes-back-to-the-future/, 7 pgs.

"VSS 101 and Design Considerations in VMware environment (Part I)", super sonic dog (S.S.D) (Nov. 2, 2012), downloaded from http://www.supersonicdog.com/2012/11/02/vss101/, 8 pgs.

"VVOLs, VASA—and Why It All Matters", Chuck's Blog (Nov. 18, 2013), downloaded from http://chucksblog.emc.com/chucks_blog/2013/11/vvols-vasa-and-why-it-all-matters.html, 6 pgs.

"What's'New'in'VMware'vSphere'6.0:'Virtual Volumes'(VVOLs)", Settlersoman (Feb. 12, 2015), downloaded from http:// www.settlersoman.com/whats-new-in-vmware-vsphere-6-0-virtual-volumes-vvols/, 6 pgs.

"Acronis Backup & Recovery 11.5", Acronis (last revised Aug. 22, 2012), downloaded from http://www.acronis.com/en-eu/support/documentation/ABR11.5/index.html#22887.html, 1 pg.

"Nimble Storage Windows Toolkit Guide Version 1.4.2", Nimble Storage (Jul. 29, 2013), P/N 990-0142-001, 62 pgs.

"VSS 101 and Design Considerations in VMware environment (Part II)", super sonic dog (S.S.D) (Nov. 29, 2012), downloaded from http://www.supersonicdog.com/2012/11/29/vsspart/, 6 pgs.

"Providers", Microsoft, accessed May 20, 2015 from https://msdn.microsoft.com/en-us/librarytaa384594(v=vs.85).aspx, 2 pgs.

\* cited by examiner

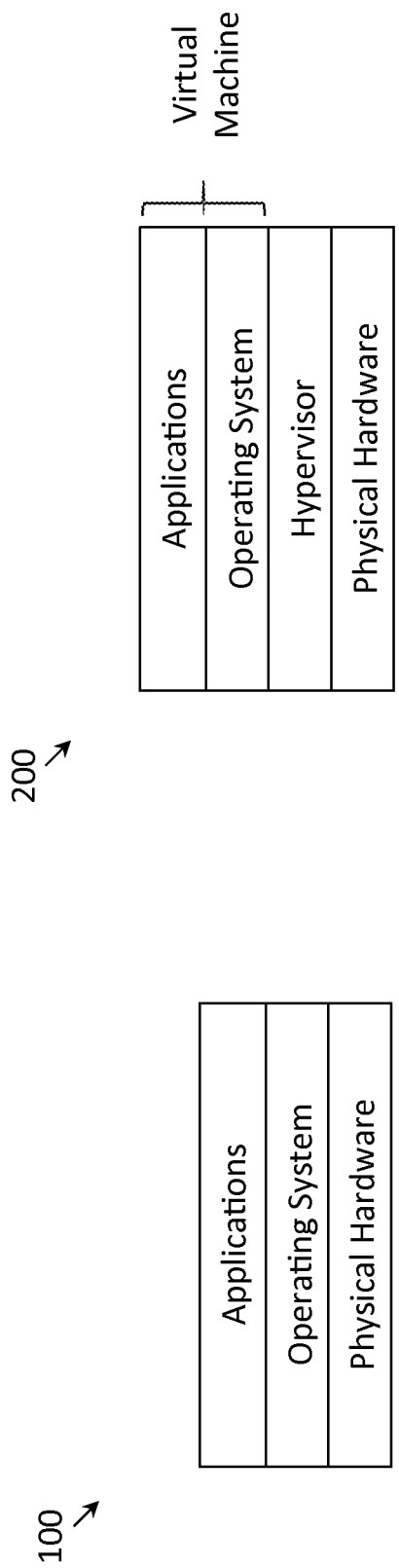

| VVOL Identifier | Logical Unit Identifier |
|---|---|
| 4 | 1 |
| 6 | 3 |
| 9 | 2 |
| 3 | 5 |

METHODS AND SYSTEMS FOR INTEGRATING A VOLUME SHADOW COPY SERVICE (VSS) REQUESTER AND/OR A VSS PROVIDER WITH VIRTUAL VOLUMES (VVOLS)

FIELD OF THE INVENTION

The present invention relates to methods and systems for taking snapshots of data associated with a virtual machine, and more particularly relates to configuring a volume shadow copy service (VSS) requester and/or VSS provider to operate with virtual volumes (VVOLs).

BACKGROUND

To provide some background of a virtual machine, abstracted representations of several computing systems are first described. FIG. 1 depicts an abstracted representation of computing system 100 with a plurality of software applications (hereinafter, "applications"), a single operating system and physical hardware. Such components at times may be referred to as the different "layers" of the computing system (i.e., applications layer, operating system layer, physical hardware layer). The applications utilize the physical hardware (e.g., processors, memory, disk drives, network interface card, sound card, etc.) to help a user perform a specific task (e.g., word processing, surfing the web, etc.). The applications, however, typically do not interact directly with the physical hardware of computing system 100. Instead, the applications interact with the physical hardware through an operating system. For example, an application may send a request to the operating system to store data on a storage device of the physical hardware, and the operating system, in turn, may perform such request on behalf of the application. A single operating system typically hosts a plurality of applications, and accordingly, is tasked with managing how the applications share the resources of the physical hardware so that there are no contentions, data corruption, etc. On the other hand, the physical hardware of computer system 100 can typically only host a single operating system (or more precisely, only one operating system at any moment).

FIG. 2 depicts an abstracted representation of computing system 200 with an added layer between the operating system and the physical hardware. This layer is called the hypervisor (or also the virtual machine manager). In an analogous manner to how an operating system can manage how a plurality of applications share the resources of the physical hardware, the hypervisor can manage how a plurality of operating systems share the resources of the physical hardware. In computing system 200, the top two layers (i.e., applications and operating system) can be bundled together as a single unit, called a virtual machine.

Since the hypervisor allows a plurality of operating systems to execute at the same time, a plurality of virtual machines can also execute at the same time. Such an arrangement is depicted in computer system 300 of FIG. 3, in which the hypervisor hosts a plurality of virtual machines (VMs). Each virtual machine could be a virtual desktop, allowing a plurality of users to share the resources of the physical hardware. Alternatively, each virtual machine could be a web server and/or an application server, allowing a plurality of enterprises to share the resources of the physical hardware.

A virtual machine is typically characterized by the following information: virtual machine data, virtual machine configuration, and virtual machine operational state. Virtual machine data may refer to the contents of the virtual machine's hard disk (i.e., in-disk data). Such contents may include the virtual machine's operating system and application data. In some cases, a virtual machine's hard disk may correspond to a dedicated physical hard disk (i.e., physical hard disk that is dedicated to the virtual machine), while in other cases it may correspond to a collection of hard disks shared by a number of virtual machines. In the latter case, a virtual machine's hard disk may more specifically correspond to portions of one or more physical hard disks that are accessible to the virtual machine. In some cases, a virtual machine's hard disk is represented by one or more files (e.g., .vmdk files) (also called "virtual disks" or "virtual hard disks") that are stored in the collection of hard disks. Virtual machine data may additionally refer to the contents of the virtual machine's memory (i.e., in-memory data). Typically, a virtual machine's memory does not correspond to a dedicated memory card or memory chip (i.e., memory card or memory chip that is dedicated to the virtual machine). Rather, a pool of memory (e.g., formed by a plurality of memory cards and/or memory chips) is typically shared by a number of virtual machines, so a virtual machine's memory more accurately corresponds to portions of one or more memory cards and/or memory chips that are accessible to the virtual machine.

Virtual machine configuration may refer to the hardware resources required or requested by a virtual machine (e.g., the number of virtual central processing units (CPUs), an amount of random-access memory (RAM), the number of network interface cards (NICs), etc., and what type of each of the hardware components, if the hardware components come in different types). A virtual CPU refers to one or more CPUs of the physical hardware that may be shared by one or more virtual machines.

Virtual machine operational state may refer to the operational state of a virtual machine (e.g., whether the virtual machine is powered off, powered on, suspended, whether the contents of the virtual machine's memory have been written to a swap file, the number of virtual machine snapshots, the relationship between snapshots and the virtual machine's disks, etc.).

The state of a virtual machine typically refers to one or more of the virtual machine data, the virtual machine configuration, and virtual machine operational state at a particular point in time. In some cases, the state of a virtual machine refers to the virtual machine data, the virtual machine configuration, and virtual machine operational state (i.e., all three) at a particular point in time. It is noted that there is a potential for confusion in terminology as the "virtual machine operational state" is sometimes called "virtual machine state" by those in the field of the art, so it is necessary to rely on the context in which the term (i.e., virtual machine state) is used in order to determine whether virtual machine state refers to one or more of the virtual machine data, the virtual machine configuration, and virtual machine operational state at a particular point in time, or just the virtual machine operational state. To avoid such confusion, virtual machine state will hereinafter refer to one or more of the virtual machine data, the virtual machine configuration, and virtual machine operational state at a particular point in time. When referring specifically to the virtual machine operational state, the term "virtual machine operational state" will be used rather than the "virtual machine state".

An operation that can be performed to preserve the state of a virtual machine at a particular point in time is called snapshotting. The information representing the state of a virtual machine at a particular point in time, after a snapshotting operation, may be called a virtual machine snapshot (or just a snapshot in short, if the context is clear). After a snapshot is taken at a particular time, a user can revert to the state of the virtual machine at that particular time (i.e., return one or more of the virtual machine data, virtual machine operational state, and virtual machine configuration to the state they were in at the time the snapshot was taken).

SUMMARY OF THE INVENTION

In accordance with one embodiment, one or more components associated with a volume shadow copy service (VSS) are configured to operate with virtual volumes (VVOLs). The VSS is a framework that facilitates the snapshot of a virtual machine (or data that belongs to the virtual machine) while the virtual machine continues to operate (e.g., receive requests from a client, transmit data to a client, etc.). In one embodiment, the VSS may be instantiated within the virtual machine, and the virtual machine may execute on a host device. One or more virtual disks of the virtual machine may be stored on a storage array communicatively coupled to the host device. The storage entity which stores a virtual disk may be known as a "logical unit" (or a volume, or a file) by processes which operate on the storage array, while the same storage entity may be known as a "virtual volume" by processes which operate on the host device. A logical unit and a virtual volume which reference the same underlying storage entity may be associated with (or mapped to) one another.

A difficulty created by the difference in naming is that processes which operate on the storage array may be configured to use logical unit identifiers (e.g., identifiers that identify specific logical units or file handles that identify an inode), while processes which operate on the host device may be configured to use VVOL identifiers (e.g., identifiers that identify specific VVOLs). To address this difficulty, respective VVOL identifiers may be mapped to respective logical unit identifiers when processes on the storage array receive VVOL identifiers. Likewise, respective logical unit identifiers may be mapped to respective VVOL identifiers when processes on the host device receive logical unit identifiers. In another embodiment, respective VVOL identifiers may be translated into respective logical unit identifiers before a request directed at certain VVOLs is transmitted to the storage array. Likewise, respective logical unit identifiers may be translated into respective VVOL identifiers before a request directed at certain logical units is transmitted to the host device.

In accordance with one embodiment, the storage array may transmit a request to a VSS requester (i.e., a component that communicates with the VSS) to take a snapshot of a logical unit. The VSS requester may map the logical unit into a VVOL. Subsequently, a VSS writer (i.e., another component that communicates with the VSS) may bring the data on the VVOL to an application consistent state. More specifically, the VSS writer may quiesce an application which stores data on the VVOL. After the application has been quiesced by the VSS writer, the VSS may flush the data in the buffer cache of the application to the VVOL. The quiescing of the application and the flushing of the buffer cache allow the snapshot to be "application consistent" rather than "crash consistent" (i.e., allowing the snapshot to capture the in-memory data of the application in addition to the in-disk data). A VSS provider (i.e., another component that communicates with the VSS) may then communicate with the storage array in order to take a snapshot of the VVOL. Since the storage array references logical units (not VVOLs), the VSS provider may need to translate the VVOL into a logical unit, and request the storage array to take a snapshot of the logical unit mapped to the VVOL.

In accordance with one embodiment, a virtual machine may be instantiated on a host. The virtual machine may comprise a VSS requester and a VSS provider, and the VSS provider (and possibly the VSS requester) may be associated with a storage array. The VSS requester may receive a request to take a snapshot of a VVOL, the VVOL identified by a VVOL identifier. The VSS provider may determine whether the VSS provider supports taking the snapshot of the VVOL. The determination may be based on information derived from a mapping which maps respective VVOL identifiers to respective logical unit identifiers. If the VSS provider supports taking the snapshot of the VVOL, the VSS provider may take the snapshot of the VVOL. Taking the snapshot of the VVOL may comprise requesting the storage array to take a snapshot of a logical unit stored on the storage array, the logical unit identified by a logical unit identifier, and the VVOL identifier mapped to the logical unit identifier in the mapping.

These and other embodiments of the invention are more fully described in association with the drawings below.

BRIEF DESCRIPTION OF THE DRAWINGS

FIG. 1 depicts an abstracted representation of a computing system in which the operating system directly interfaces with the physical hardware of the computing system.

FIG. 2 depicts an abstracted representation of a computing system in which the operating system interfaces with the physical hardware via a hypervisor.

FIG. 8 depicts a table containing an exemplary mapping between respective virtual volume identifiers and logical unit identifiers, in accordance with one embodiment.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. Description associated with any one of the figures may be applied to a different figure containing like or similar components/steps. While the flow diagrams each present a series of steps in a certain order, the order of the steps may be changed.

Figure 4:
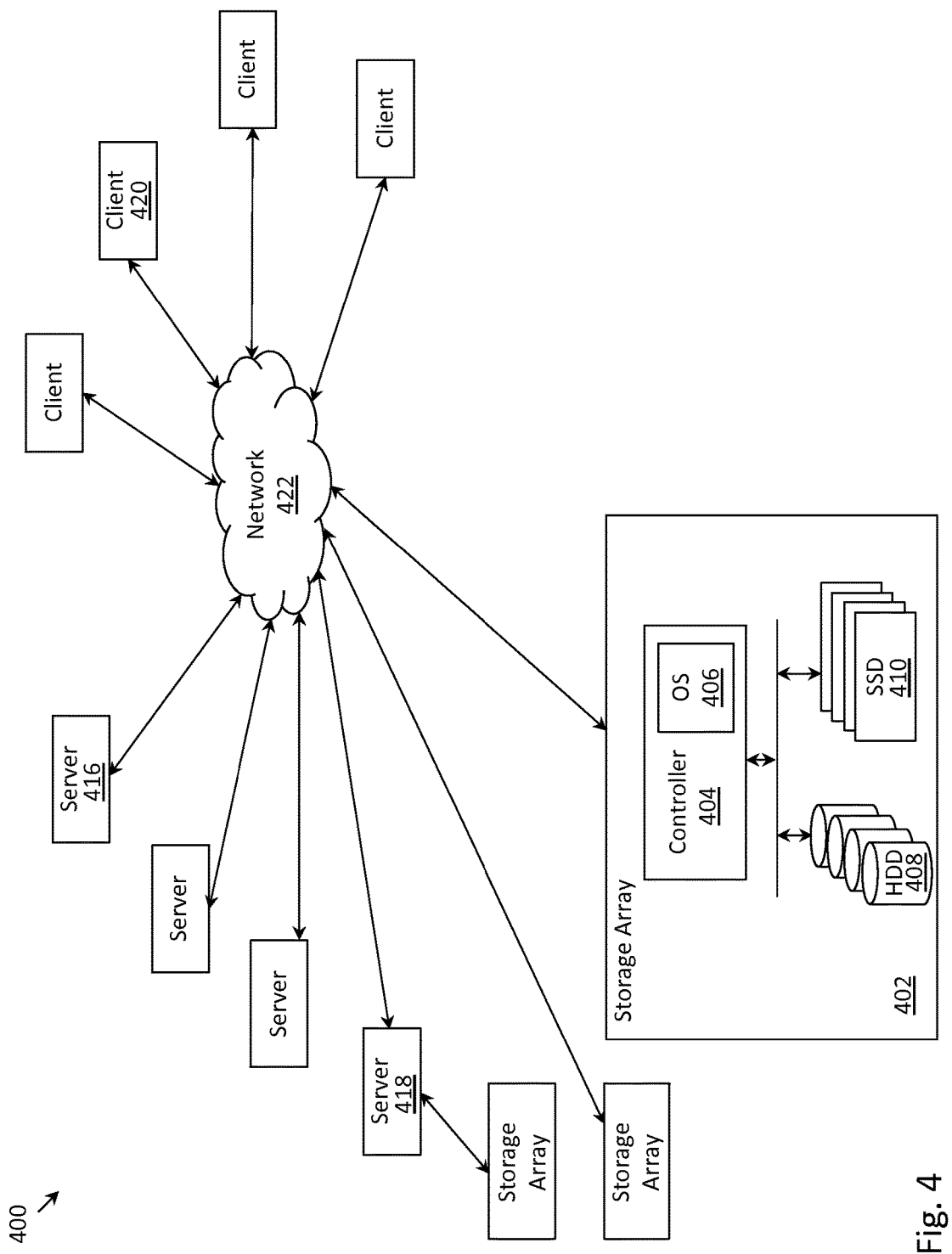
FIG. 4 depicts a system with network storage, in accordance with one embodiment.

In the example architecture 400 of FIG. 4, one or more storage arrays 402 provide storage services to one or more servers 416, 418 (which are referred to herein as hosts) and to one or more clients 420. The configuration will depend on the implementation of the storage array and the demand by application. Network 422 provides transport for the data exchanges between the storage array 402 and servers 416 or clients 420. In addition, server 418 may be directly connected to a storage array without communicating through network 422. Storage array 402 includes one or more controllers 404, one or more hard disk drives (HDD) 408, and one or more solid state drives (SSDs) 410, also referred to herein as flash cache.

Figure 5:
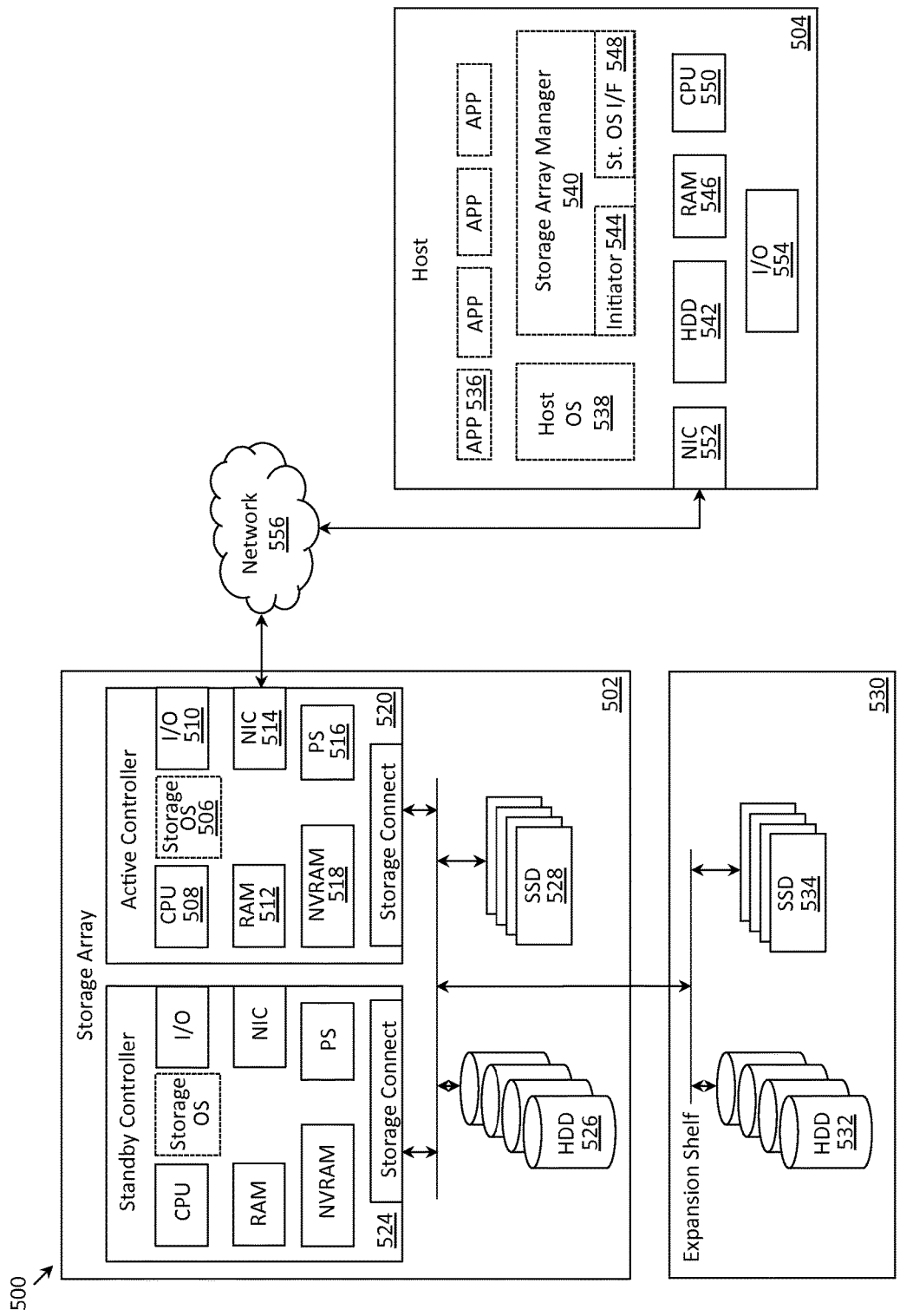
FIG. 5 depicts the architecture of a storage array and host device, in accordance with one embodiment.

FIG. 5 depicts system 500 including storage array 502 communicatively coupled to host 504 via network 556. FIG. 5 illustrates an example architecture of a storage array 502, according to one embodiment. In one embodiment, storage array 502 includes an active controller 520, a standby controller 524, one or more HDDs 526, and one or more SSDs 528. In one embodiment, the controller 520 includes non-volatile RAM (NVRAM) 518, which is for storing the incoming data as it arrives to the storage array. After the data is processed (e.g., compressed and organized in segments (e.g., coalesced)), the data is transferred from the NVRAM 518 to HDD 526, or to SSD 528, or to both.

In addition, the active controller 520 further includes CPU 508, general-purpose RAM 512 (e.g., used by the programs executing in CPU 508), input/output module 510 for communicating with external devices (e.g., USB port, terminal port, connectors, plugs, links, etc.), one or more network interface cards (NICs) 514 for exchanging data packages through network 556, one or more power supplies 516, a temperature sensor (not shown), and a storage connect module 522 for sending and receiving data to and from the HDD 526 and SSD 528. In one embodiment, standby controller 524 includes the same components as active controller 520.

Active controller 520 is configured to execute one or more computer programs stored in RAM 512. One of the computer programs is the storage operating system (OS) used to perform operating system functions for the active controller device. In some implementations, one or more expansion shelves 530 may be coupled to storage array 502 to increase HDD 532 capacity, or SSD 534 capacity, or both.

Active controller 520 and standby controller 524 have their own NVRAMs, but they share HDDs 526 and SSDs 528. The standby controller 524 receives copies of what gets stored in the NVRAM 518 of the active controller 520 and stores the copies in its own NVRAM. If the active controller 520 fails, standby controller 524 takes over the management of the storage array 502. When servers, also referred to herein as hosts, connect to the storage array 502, read/write requests (e.g., I/O requests) are sent over network 556, and the storage array 502 stores the sent data or sends back the requested data to host 504.

Host 504 is a computing device including a CPU 550, memory (RAM) 546, permanent storage (HDD) 542, a NIC card 552, and an I/O module 554. The host 504 includes one or more applications 536 executing on CPU 550, a host operating system 538, and a computer program storage array manager 540 that provides an interface for accessing storage array 502 to applications 536. Storage array manager 540 includes an initiator 544 and a storage OS interface program 548. When an I/O operation is requested by one of the applications 536, the initiator 544 establishes a connection with storage array 502 in one of the supported formats (e.g., iSCSI, Fibre Channel, or any other protocol). The storage OS interface 548 provides console capabilities for managing the storage array 502 by communicating with the active controller 520 and the storage OS 506 executing therein.

To process the I/O requests, resources from the storage array 502 are required. Some of these resources may be a bottleneck in the processing of storage requests because the resources are over utilized, or are slow, or for any other reason. In general, the CPU and the hard drives of the storage array 502 can become over utilized and become performance bottlenecks. For example, the CPU may become very busy because the CPU is utilized for processing storage I/O requests while also performing background tasks, such as garbage collection, snapshots, replication, alert reporting, etc. In one example, if there are many cache hits (i.e., the SSD contains the requested data during I/O requests), the SSD cache, which is a fast responding system, may press the CPU for cycles, thus causing potential bottlenecks for other requested I/Os or for processing background operations.

The hard disks may also become a bottleneck because the inherent access speed to data is slow when compared to accessing data from memory (e.g., NVRAM) or SSD 528. Embodiments presented herein are described with reference to CPU and HDD bottlenecks, but the same principles may be applied to other resources, such as a system with insufficient amount of NVRAM.

One controller serves as the active controller 520, while the other controller 524 functions as a backup controller (standby). For redundancy, if the active controller 520 were to fail, immediate transparent handoff of processing (i.e., fail-over) can be made to the standby controller 524. Each controller is therefore configured to access the storage elements, which in one embodiment includes hard disk drives (HDDs) 526, 532 and solid-state drives (SSDs) 528, 534.

As used herein, SSDs functioning as flash cache, should be understood to operate the SSD as a cache for block level data access, providing service to read operations instead of only reading from HDDs 526. Thus, if data is present in SSDs 528, reading will occur from the SSDs instead of requiring a read to the HDDs 526, which is a slower operation. As mentioned above, the storage operating system 506 is configured with an algorithm that allows for intelligent writing of certain data to the SSDs 528 (e.g., cache-worthy data), and all data is written directly to the HDDs 526 from NVRAM 518.

In some implementations, SSDs 528 may be referred to as flash, or flash cache, or flash-based memory cache, or flash drives, storage flash, or simply cache. Consistent with the use of these terms, in the context of storage array 502, the various implementations of SSD 528 provide block level caching to storage, as opposed to instruction level caching. As mentioned above, one functionality enabled by algorithms of the storage OS 506 is to provide storage of cache-worthy block level data to the SSDs, so that subsequent read operations are optimized (i.e., reads that are likely to hit the flash cache will be stored to SSDs 528, as a form of storage caching, to accelerate the performance of the storage array 502).

In one embodiment, it should be understood that the "block level processing" of SSDs 528, serving as storage cache, is different than "instruction level processing," which is a common function in microprocessor environments. In one example, microprocessor environments utilize main memory and various levels of cache memory (e.g., L1, L2, etc.). Instruction level caching is differentiated further, because instruction level caching is block-agnostic, meaning that instruction level caching is not aware of what type of application is producing or requesting the data processed by the microprocessor. Generally speaking, the microprocessor is required to treat all instruction level caching equally, without discriminating or differentiating processing of different types of applications.

In the various implementations described herein, the storage caching facilitated by SSDs 528 is implemented by algorithms exercised by the storage OS 506, which can differentiate between the types of blocks being processed for each type of application or applications. That is, block data being written to the storage elements (e.g., HDDs 526, HDDs 532, SSDs 528 and/or SSDs 534) can be associated with block data specific applications. For instance, one application may be a mail system application, while another application may be a financial database application, and yet another may be for a website-hosting application. Each application can have different storage accessing patterns and/or requirements. In accordance with several embodiments described herein, block data (e.g., associated with the specific applications) can be treated differently when processed by the algorithms executed by the storage OS 506, for efficient use of flash cache 528.

Continuing with the example of FIG. 5, the active controller 520 is shown including various components that enable efficient processing of storage block reads and writes. The standby controller 524 is configured to provide redundancy, and will not be described in detail aside from noting that either all or most or some of the components of the active controller 520 can be provided by standby controller 524. Continuing with the example of the active controller 520, the CPU 508 is configured to manage various systems and provide processing power for the storage operations of the storage array 502. In one embodiment, a network interface card (NIC) 514 is provided to interface the storage array to the network 556. The NIC 514, in one embodiment is configured to access the network 556 utilizing a TCP/IP protocol (e.g., Ethernet).

Figure 6A:
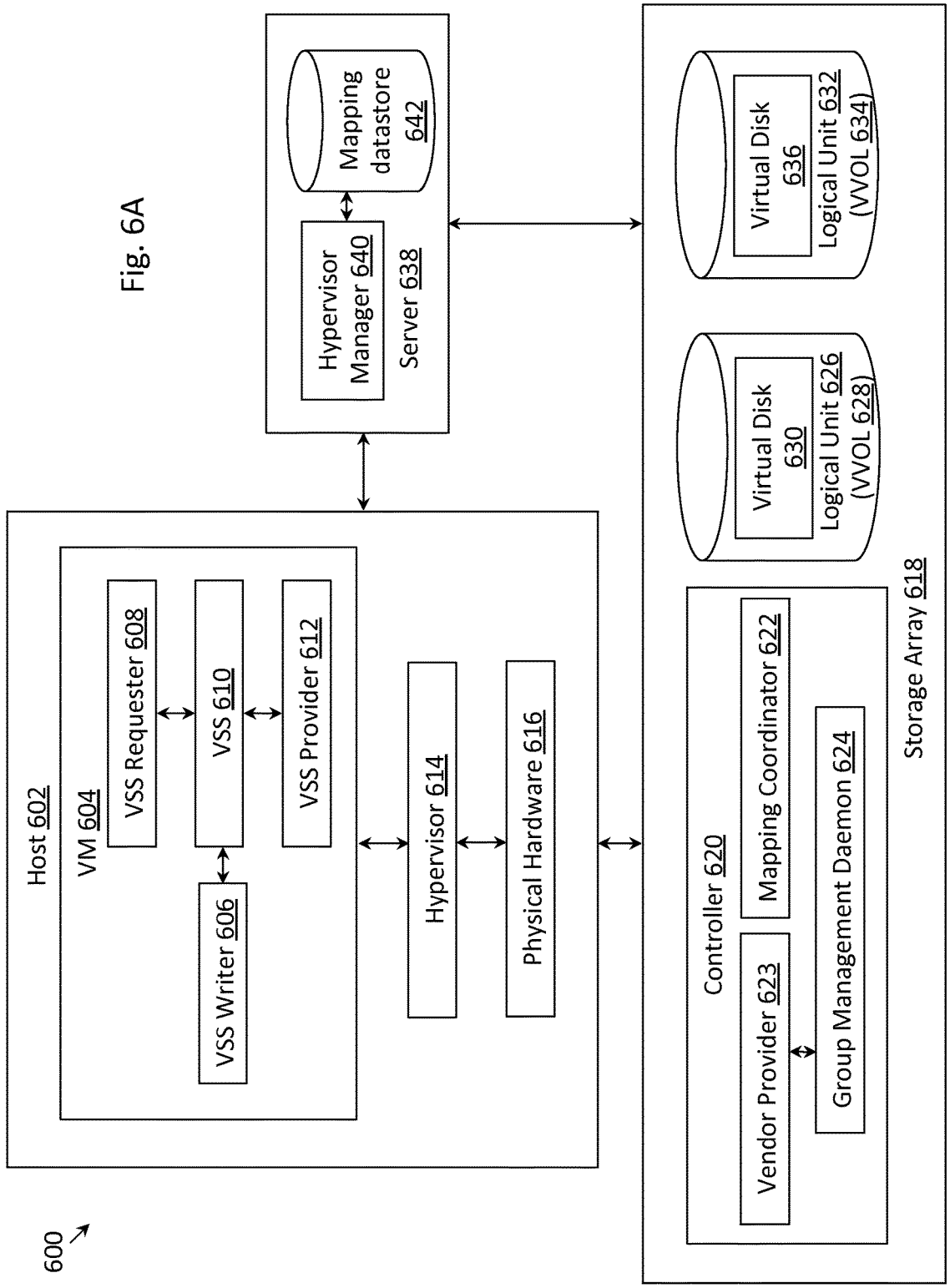
FIG. 6A depicts a storage array communicatively coupled to a host device, in accordance with one embodiment.

FIG. 6A depicts system 600 (which is a variant of system 500), within which embodiments of the present invention may be instantiated. In system 600, storage array 618 (which may be an embodiment of storage array 502) may be communicatively coupled to host 602 (which may be an embodiment of host 504). Instantiated within host 602 is hypervisor 614, which may interface virtual machine (VM) 604 with physical hardware 616 of host 602. Examples of hypervisors are ESX™ (or an ESX host) from VMware, Inc.™ of Palo Alto, Calif.; a Xen™ hypervisor from Citrix Systems™ of Fort Lauderdale, Fla.; and a Hyper-V™ from Microsoft Corporation™ of Redmond, Wash. The number of virtual machines per hypervisor (1 in this description) is exemplary and a greater number of virtual machines per hypervisor may be present in practice.

Figure 3:
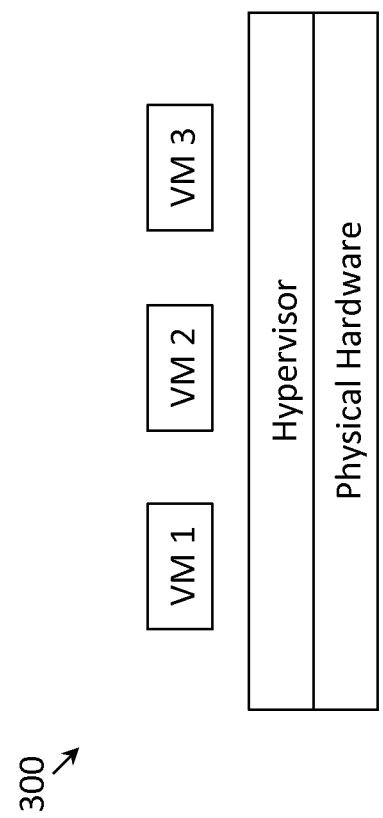
FIG. 3 depicts an abstracted representation of a computing system in which a hypervisor interfaces a plurality of virtual machines with the physical hardware of the computing system.

It is noted that host 602 may be one embodiment of computer system 300 depicted in FIG. 3. One feature of host 602 not described above in connection with FIG. 3 is that some of the virtual machine state (e.g., virtual machine data, virtual machine operational state, and virtual machine configuration) may not be stored locally on physical hardware 616 of host 602, but rather may be stored remotely on storage array 618 (i.e., remote from the perspective of host 602). With respect to the virtual machine data, the in-memory data of VM 604 may be stored on the memory of physical hardware 616, while the in-disk data of VM 604 may be stored on storage array 618.

For ease of explanation, the internal components of storage array 502 of FIG. 5 have been redrawn in storage array 618 of FIG. 6A. Depicted within storage array 618 are logical units 626 and 632, which represent storage areas located on one or more of disk drives 526 and 532 (and/or one or more of SSDs 528 and 534). If storage array 618 were implemented with RAID (redundant array of independent disks) techniques, logical unit 626 (or logical unit 632) may be a logical partition of a RAID group of storage array 618. While only two logical units have been depicted, another number of logical units may be present on storage array 618 in practice.

Storage areas 626 and 632 may be referenced by storage array 618 as logical units, while these same storage areas may be referenced by processes on host 602 as virtual volumes (or VVOLs). Stated differently, one entity for storing data may be a logical unit from the perspective of storage array 618 while the same entity for storing data may be a VVOL from the perspective of host 602. More specifically, the entity for storing virtual disk 630 may be logical unit 626 from the perspective of storage array 618, while this same entity may be VVOL 628 from the perspective of host 602. Likewise, the entity for storing virtual disk 636 may be logical unit 632 from the perspective of storage array 618, while this same entity may be VVOL 634 from the perspective of host 602. There may be a one-to-one mapping between respective logical unit identifiers and respective virtual volume identifiers so that host 602 and storage array 618 may be able to reconcile disparate identifiers that address the same storage area. Such mapping will be described in more detail below.

To allow a more granular backup and recovery of data, a single virtual disk may be stored in logical unit 626 (or equivalently VVOL 628). For example, virtual disk 630 may be stored within logical unit 626 (or equivalently VVOL 628) and virtual disk 636 may be stored within logical unit 632 (or equivalently VVOL 634). To backup virtual disk 630, a snapshot may be taken of logical unit 626. Likewise, to backup virtual disk 636, a snapshot may be taken of logical unit 632. Such storage of one virtual disk per logical unit allows a more granular backup and recovery of data than, for example, if both virtual disks 626 and 630 were stored in logical unit 628. In this latter scenario, virtual disks 626 and 630 would need to be backed-up together and recovered together by storage array 618.

Instantiated within VM 604 may be volume shadow copy service (VSS) 610 (and its associated components) which allows a snapshot of a volume (e.g., a logical unit or a VVOL) to be taken while one or more applications (not depicted) on VM 604 continue to issue write requests to the volume. More precisely, one task of VSS 610 (and its associated components) is to buffer the write requests to the volume while the snapshot of the volume is underway, so that any new write requests that are received after the snapshot operation has started are not processed until after the snapshot operation has concluded. There may be three components that are associated with and communicate with VSS 610: VSS requester 608, VSS writer 606, and VSS provider 612. As a brief overview of these components, VSS requester 608 may receive a snapshot request; VSS writer 606 may manage application data (e.g., completing any existing write requests prior to a snapshot operation, buffering any new write requests while a snapshot is in progress); and VSS provider 612 (e.g., a VSS hardware provider) may manage storage volumes and create snapshots (e.g., may work with storage array 618 in order to take a snapshot of a volume). It is noted that VSS requester 608, VSS writer 606 and VSS provider 612 could be developed by different vendors (e.g., enterprises). For example, Commvault™ from Commvault Systems, Inc.™ of Tinton Falls, N.J. is a backup application (i.e., a VSS requester) that may communicate with VSS in order to take an application consistent snapshot of Microsoft Exchange™ (i.e., a VSS writer) running on a storage array from Nimble Storage™ of San Jose, Calif. using Nimble Storage's VSS hardware provider.

In one embodiment, VSS requester 608 may be associated with storage array 618. More specifically, VSS requester 608 may be developed by the same vendor that develops storage array 618. Accordingly, VSS requester 608 from vendor A may be configured to work with a storage array developed by vendor A, but not with a storage array developed by vendor B. While VSS requester 608 may be associated with storage array 618, this is not necessarily so. In another embodiment, VSS requester 608 may be a third-party backup application (i.e., "third-party" meaning that VSS requester 608 is developed by a vendor other than that which develops storage array 618). Likewise, VSS provider 612 may be associated with storage array 618. More specifically, VSS provider 612 may be developed by the same vendor that develops storage array 618. Accordingly, VSS provider 612 from vendor A may be configured to work with a storage array developed by vendor A, but not with a storage array developed by vendor B. The functionality of each of VSS requester 608, VSS writer 606, VSS 610 and VSS provider 612 will be described in more detail below.

FIG. 6A also depicts mapping coordinator 622, vendor provider 623 and group management daemon 624, each of which may be instantiated on storage array 618, or more specifically, instantiated on controller 620 of storage array 618. While mapping coordinator 622 is depicted separately from vendor provider 623 and group management daemon 624 in the embodiment of FIG. 6A, mapping coordinator 622 may be part of vendor provider 623 and/or part of group management daemon 624 in other embodiments. Hypervisor manager 640 (which may be instantiated on server 638) may maintain a mapping between respective logical units and respective virtual volumes. In one embodiment, such mapping may be stored in mapping datastore 642. An example of hypervisor manager 640 is a vCenter Server™ from VMware. The functionality of mapping coordinator 622, vendor provider 623, group management daemon 624 and hypervisor manager 640 will also be described in more detail below.

Figure 6B:
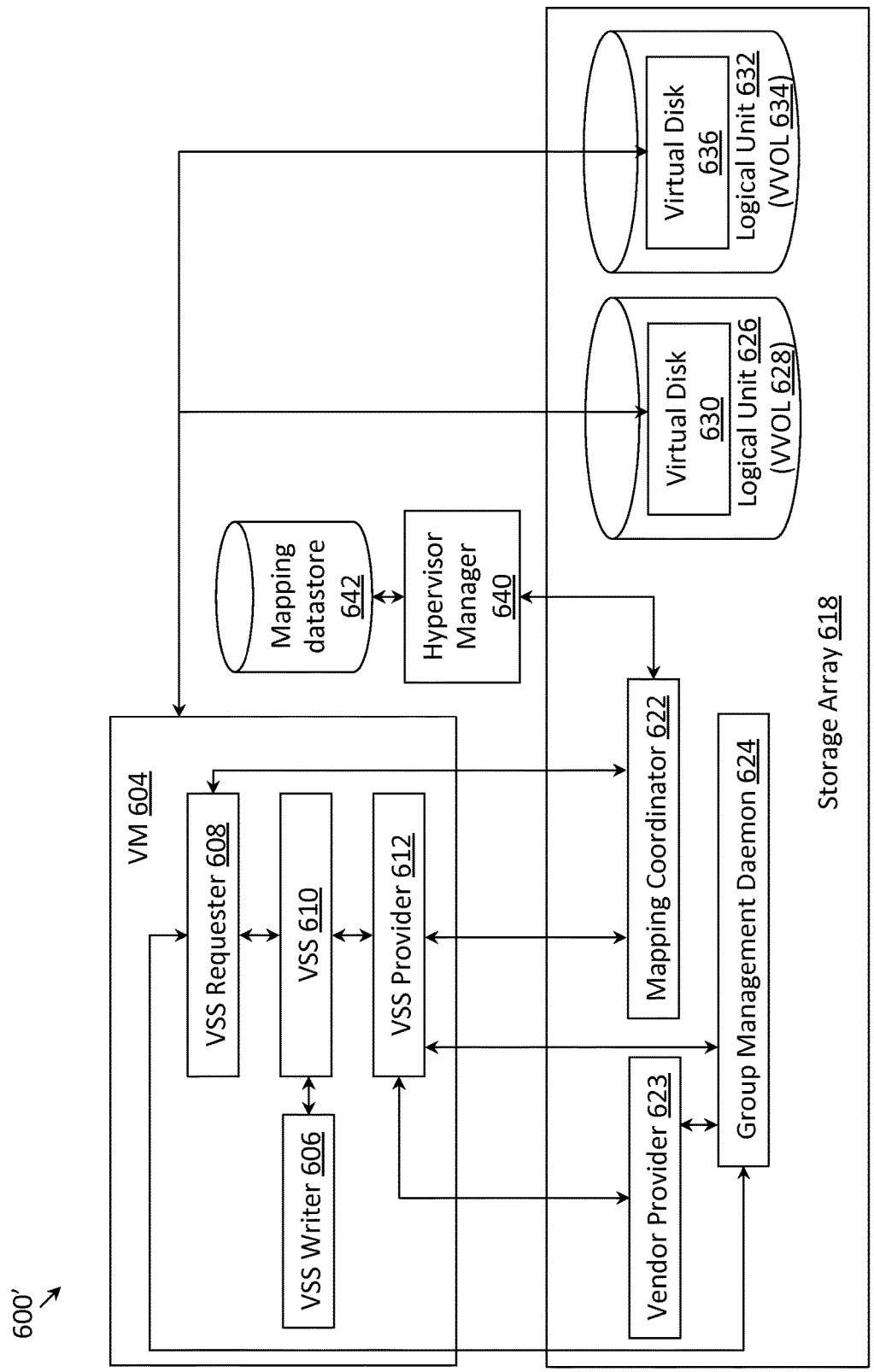
FIG. 6B depicts a storage array communicatively coupled to a host device, in accordance with one embodiment.

FIG. 6B depicts system 600' which is an abstracted version of system 600. Certain components of system 600 are not depicted in system 600' (e.g., host 602, hypervisor 614, physical hardware 616, controller 620 and server 638) in order for the discussion to more clearly focus on the components that are depicted in system 600'. In other words, it should be understood that system 600 may be the underlying representation of system 600'.

An overview of a snapshot process is now described in the context of FIG. 6B. First, group management daemon 624 may transmit a snapshot request to VSS requester 608, requesting the snapshot of a specific logical unit. For ease of discussion, assume the specific logical unit is logical unit 626 for the remainder of the overview. In response to the request, VSS requester 608 may communicate with mapping coordinator 622 (which in turn may access application program interfaces (APIs) provided by hypervisor manager 640 and/or group management daemon 624) in order to map logical unit 626 into VVOL 628. VSS requester 608 may then alert VSS 610 that a request has been received to take a snapshot of VVOL 628. VSS 610 may then request VSS writer 606 to quiesce the application which stores data on VVOL 628. For example, VSS writer 606 may complete in-progress write requests to VVOL 628 and hold all "new" write requests to VVOL 628 in a queue (i.e., new write requests being those that have not yet been processed). After the application has been quiesced by VSS writer 606, VSS 610 may flush the data in the buffer cache of the application (i.e., buffer cache located in physical hardware 616) to virtual disk 630 of VVOL 628. The flushing of the buffer cache allows the snapshot to be "application consistent" rather than "crash consistent" (i.e., allowing the snapshot to capture the in-memory data of the application in addition to the in-disk data).

VSS 610 may then instruct VSS provider 612 to take a snapshot of VVOL 628. VSS provider 612 may then coordinate with storage array 618 in order to take the snapshot of VVOL 628. Since storage array 618 references logical units (not VVOLs), VSS provider 612 may need to translate VVOL 628 into logical unit 626. While VSS requester 608 mapped logical unit 626 into VVOL 628, and certainly could map VVOL 628 back into logical unit 626, VSS provider 612 may not be in direct communication with VSS requester 608 (e.g., cannot communicate with VSS requester 608 regarding the mapping). Accordingly, VSS provider 612 may also communicate with mapping coordinator 622 (which in turn may access APIs provided by hypervisor manager 640 and/or group management daemon 624) in order to map VVOL 628 into logical unit 626. VSS provider 612 may then request group management daemon 624 to take a snapshot of logical unit 626.

Group management daemon 624 may take a snapshot of logical unit 626 by freezing the pointers (e.g., making a copy of the pointers) that organize the data on logical unit 626. The specific manner to take a snapshot of a logical unit is known in the art and will not be described further herein.

At this point, one may wonder why group management daemon 624 requests VSS requester 608 to take a snapshot of logical unit 626 when in the end, group management daemon 624 ends up performing the snapshot. As explained above, the coordination between storage array 618 and VM 604 in the process of taking a snapshot of a logical unit (or VVOL) is important for two reasons: One, it allows the snapshot to be application-consistent (rather than crash-consistent). Second, it allows the application to be quiesced before the snapshot is performed, so that a snapshot can correspond to a specific point in time. If an application were not quiesced, data associated with write requests received after a snapshot operation has started could be incorporated into the snapshot, which would introduce some uncertainty to the exact time of the snapshot.

In one embodiment, stored within each of virtual disks 630 and 636 may be structured query language (SQL) data and/or data belonging to a VSS-aware application (i.e., an application which has a VSS writer). Examples of VSS-aware applications include Microsoft Exchange™, SQL and Microsoft Sharepoint™. As a result of integrating VSS 610 (and/or its associated components) with VVOLs, administrators have the ability to backup just the application data or a subset of the application data of VM 604. For example, an hourly SQL database backup may be performed. Further, administrators have the ability to recover application data at a more granular level (e.g., restore a SQL database or a Microsoft Exchange™ mailbox).

In one variation of system 600' (not depicted), VSS provider 612 may be communicatively coupled to storage array 618 via a third-party backup application executing on VM 604. Examples of a third-party backup application include Backup Exec™ from Symantec Corporation™ of Mountain View, Calif.; Data Protection Manager™ from Microsoft Corporation™ of Redmond, Wash.; and Fast-SCP™ from Veeam Software™ of Baar, Switzerland. Such arrangement may be beneficial as the third-party backup application may provide a richer set of features for application backups (as compared to the features provided by VSS 610).

Figure 7:
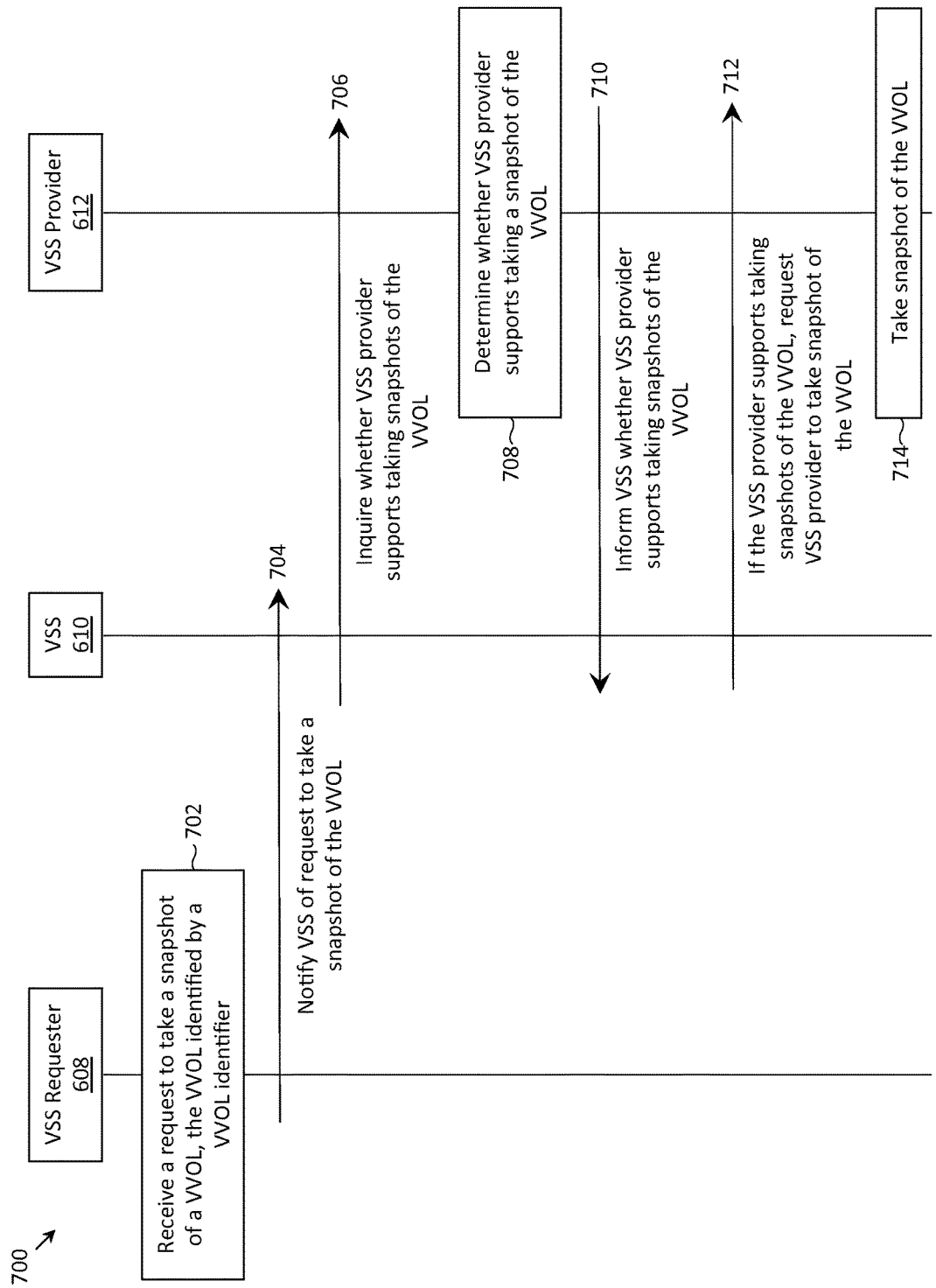
FIG. 7 depicts a sequence diagram of the steps associated with the snapshot of a virtual volume, in accordance with one embodiment.

Sequence diagrams are now presented to describe the processes performed in FIG. 6B in more detail. FIG. 7 depicts sequence diagram 700 which includes steps associated with the snapshot of a VVOL (e.g., VVOL 628), in accordance with one embodiment. At step 702, VSS requester 608 may receive a request to take a snapshot of a VVOL (e.g., VVOL 628), the VVOL identified by a VVOL identifier (e.g., a VVOL serial number assigned by VMware). Step 702 is described in more detail in FIG. 9 below. At step 704, VSS requester 608 may transmit a message to VSS 610 to inform VSS 610 of the request to take a snapshot of the VVOL. At step 706, VSS 610 may transmit a message to VSS provider 612 to inquire whether VSS provider 612 supports taking a snapshot of the VVOL.

At step 708, VSS provider 612 may determine whether it (i.e., VSS provider 612) supports taking a snapshot of the VVOL. In one embodiment, VSS provider 612 may support taking a snapshot of the VVOL if there is a logical unit mapped to the VVOL. In another embodiment, VSS provider 612 may support taking a snapshot of the VVOL if the VVOL is stored on storage array 618. In yet another embodiment, VSS provider 612 may support taking a snapshot of the VVOL if the VVOL identifier is stored in mapping datastore 642. An example of a mapping that may be stored in mapping datastore 642 is depicted in FIG. 8. Step 708 is described in greater detail in FIG. 10 below. At step 710, VSS provider 612 may inform VSS 610 whether it (i.e., VSS provider 612) supports taking a snapshot of the VVOL. If VSS provider 612 supports taking a snapshot of the VVOL, VSS 610 may request VSS provider 612 to take a snapshot of the VVOL (step 712). At step 714, VSS provider 612 may take a snapshot of the VVOL. Steps 712 and 714 are described in more detail in FIGS. 11A-11B below.

If, however, VSS provider 612 does not support taking a snapshot of the VVOL, VSS 610 may determine whether there is another provider (not depicted) that supports taking a snapshot of the VVOL. If so, VSS 610 may request the other provider that does support taking a snapshot of the VVOL to perform the snapshot. If VSS 610 is unable to determine any provider that supports taking a snapshot of the VVOL, VSS 610 may fail (e.g., terminate) the snapshot request.

Figure 9:
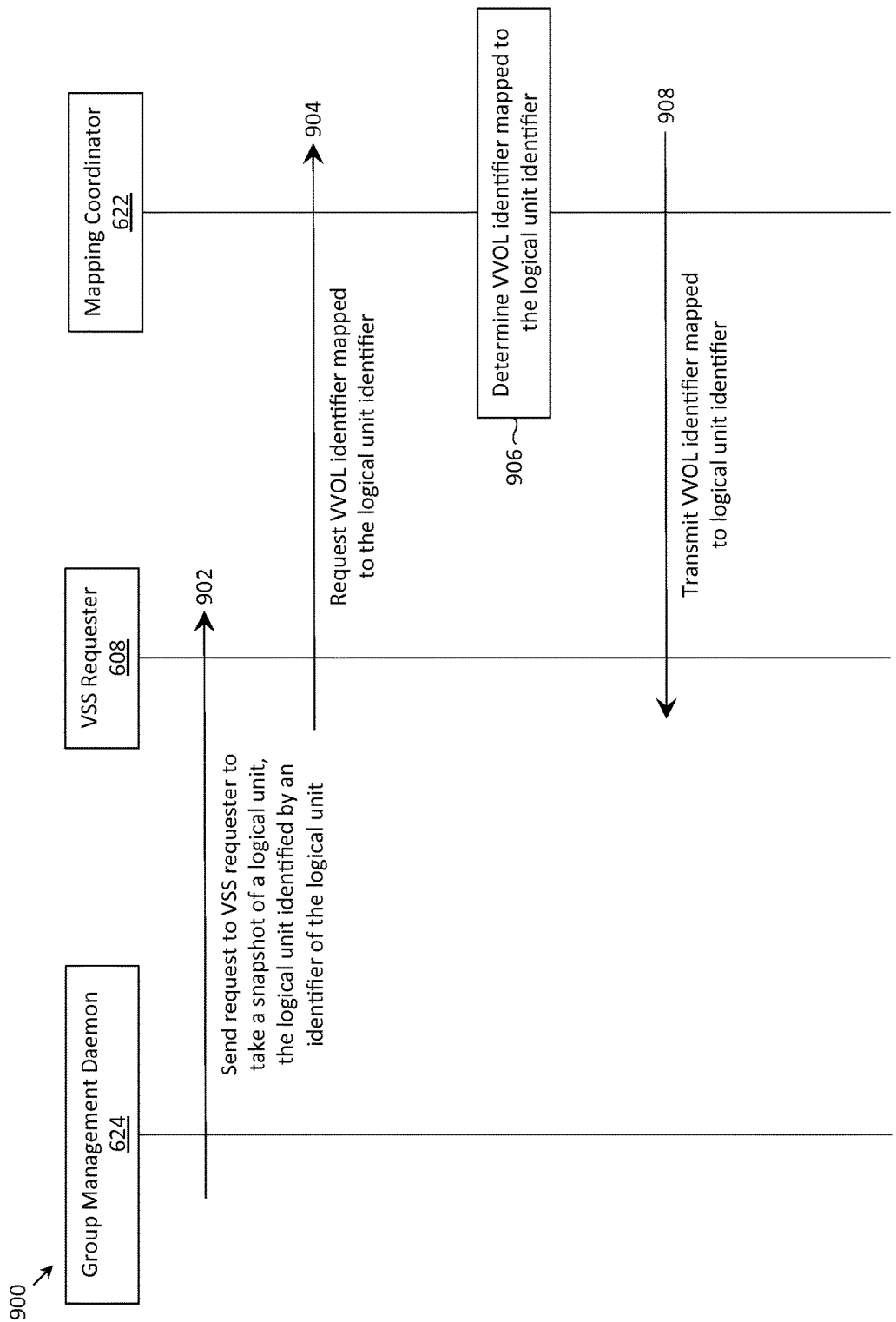
FIG. 9 depicts a sequence diagram of the steps associated with the snapshot of a virtual volume, in accordance with one embodiment.

FIG. 9 depicts sequence diagram 900 which includes steps associated with the snapshot of a VVOL (e.g., VVOL 628), in accordance with one embodiment. For clarity, it is noted that the steps of sequence diagram 900 may be performed prior to or as part of step 702 of FIG. 7. At step 902, group management daemon 624 may transmit a request to VSS requester 608, the request requesting VSS requester 608 to take a snapshot of a logical unit (e.g., logical unit 626). The logical unit may be identified by an identifier. More specifically, group management daemon 624 may call a web service API of VSS requester 608 to take a snapshot of the logical unit. At step 904, VSS requester 608 may transmit a request to mapping coordinator 622 which requests the VVOL identifier that is mapped to the logical unit identifier. At step 906, mapping coordinator 622 may determine a VVOL identifier mapped to the logical unit identifier. More specifically, in step 906, mapping coordinator 622 may utilize APIs provided by hypervisor manager 640 and/or group management daemon 624 in order to determine the VVOL identifier mapped to the logical unit identifier. At step 908, mapping coordinator 622 may transmit the VVOL identifier associated with the logical unit identifier to VSS requester 608.

To summarize, receiving the request to take a snapshot of the logical unit (step 902) and receiving the VVOL identifier associated with the logical unit identifier (step 908) may be one way that VSS requester 608 receives a request to take a snapshot of the VVOL identified by the VVOL identifier (step 702). It is noted, however, that FIG. 9 only depicts one possible way for VSS requester 608 to receive a request to take a snapshot of a VVOL. In another embodiment (not depicted), VSS requester 608 may receive a request to take a snapshot of a VVOL from group management daemon 624. Group management daemon 624 may perform the translation from a logical unit identifier to a VVOL identifier and send the VVOL identifier within the snapshot request to VSS requester 608, so that no translation of the logical unit identifier is needed at VSS requester 608. In yet another embodiment (not depicted), the VSS requester could be a third-party backup application. In such a scenario, the translation from logical unit identifier to VVOL identifier may not be needed since the third-party backup application could work exclusively with VVOL identifiers.

Figure 10:
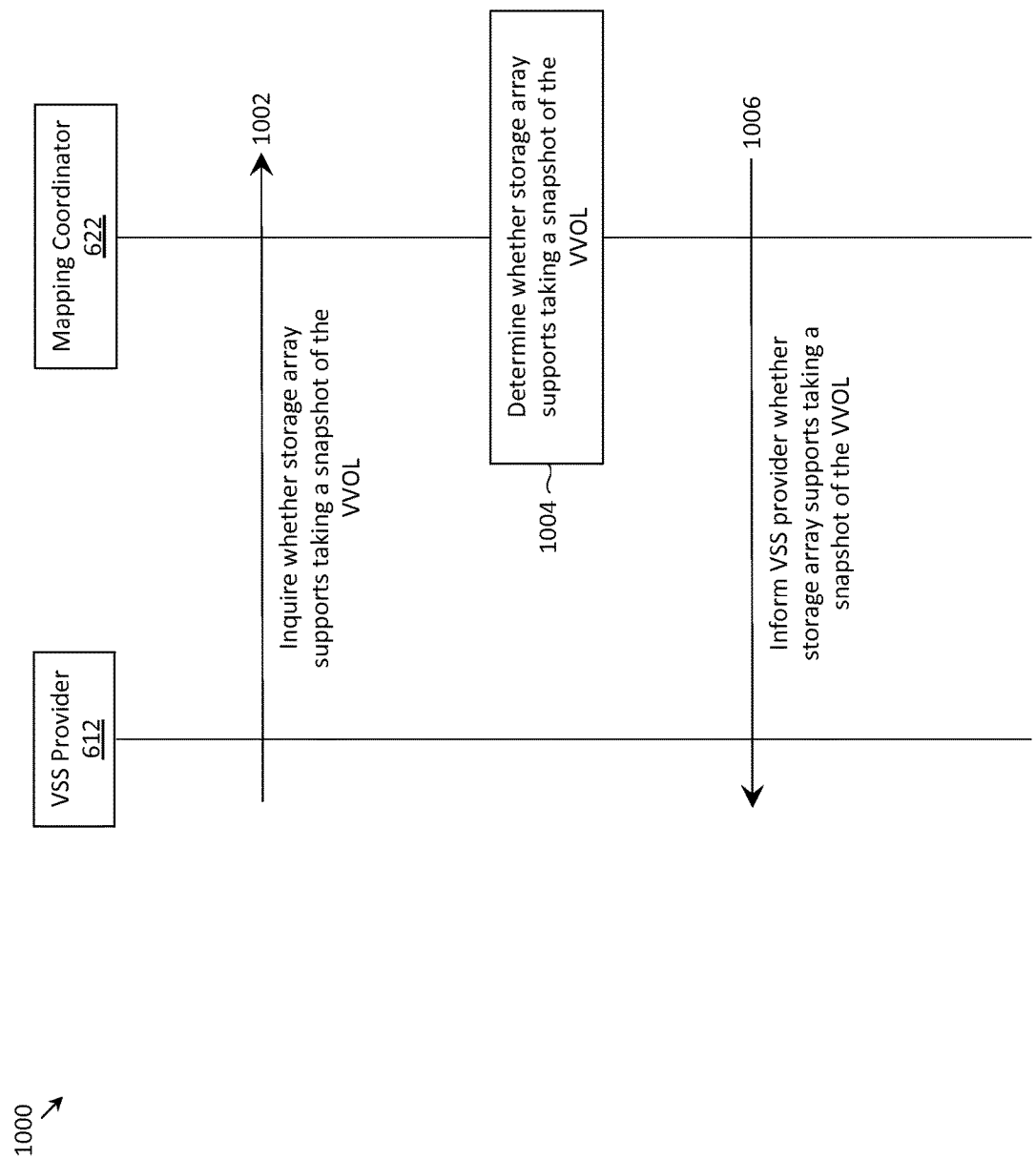
FIG. 10 depicts a sequence diagram of the steps associated with determining whether a VSS provider is able to take a snapshot of a virtual volume, in accordance with one embodiment.

FIG. 10 depicts sequence diagram 1000 of the steps associated with determining whether VSS provider 612 is able to take a snapshot of the VVOL (e.g., VVOL 628), in accordance with one embodiment. At step 1002, VSS provider 612 may transmit a message to mapping coordinator 622 to inquire whether storage array 618 supports taking a snapshot of the VVOL (the VVOL identified by the VVOL identifier). That is, VSS provider 612 may support taking a snapshot of the VVOL if storage array 618 supports taking a snapshot of the VVOL. In one embodiment, the message transmitted from VSS provider 612 to mapping coordinator 622 may inquire whether there is a logical unit associated with the VVOL. At step 1004, mapping coordinator 622 may determine whether storage array 618 supports taking a snapshot of the VVOL. In one embodiment, mapping coordinator 622 may access a mapping (see exemplary mapping 800 depicted in FIG. 8 which maps respective VVOL identifiers (e.g., VVOL serial numbers) to respective logical unit identifiers (e.g., logical unit serial numbers)) in order to determine whether there is a logical unit identifier mapped to the VVOL identifier. If there is a logical unit identifier mapped to the VVOL identifier, mapping coordinator 622 may determine that storage array 618 does support taking a snapshot of the VVOL. In one embodiment, there may be a mapping corresponding to each virtual machine. As such, mapping coordinator 622 may need to receive an identifier which identifies VM 604 in addition to the VVOL identifier in order to first determine the mapping corresponding to virtual machine 604, and then determine, using the determined mapping, whether storage array 618 supports taking a snapshot of the VVOL. In one embodiment, mapping coordinator 622 may utilize APIs provided by hypervisor manager 640 and/or group management daemon 624 in order to access mapping 800 and/or in order to perform step 1004.

At step 1006, mapping coordinator 622 may transmit a message to VSS provider 612 which informs VSS provider 612 whether storage array 618 supports taking a snapshot of the VVOL. In one embodiment, mapping coordinator 622 may inform VSS provider 612 that the VVOL identifier is stored in mapping 800 (which would indicate that storage array 618 supports taking a snapshot of the VVOL). In another embodiment, mapping coordinator 622 may transmit to VSS provider 612 the logical unit identifier mapped to the VVOL identifier (which would also indicate that storage array 618 supports taking a snapshot of the VVOL).

It is noted that sequence diagram 1000 is only one embodiment of determining whether VSS provider 612 supports taking a snapshot of the VVOL. In another embodiment, mapping 800 may be received by VSS provider 612, and VSS provider 612 can use mapping 800 to determine whether the VVOL identifier is stored in mapping 800.

Figure 11A:
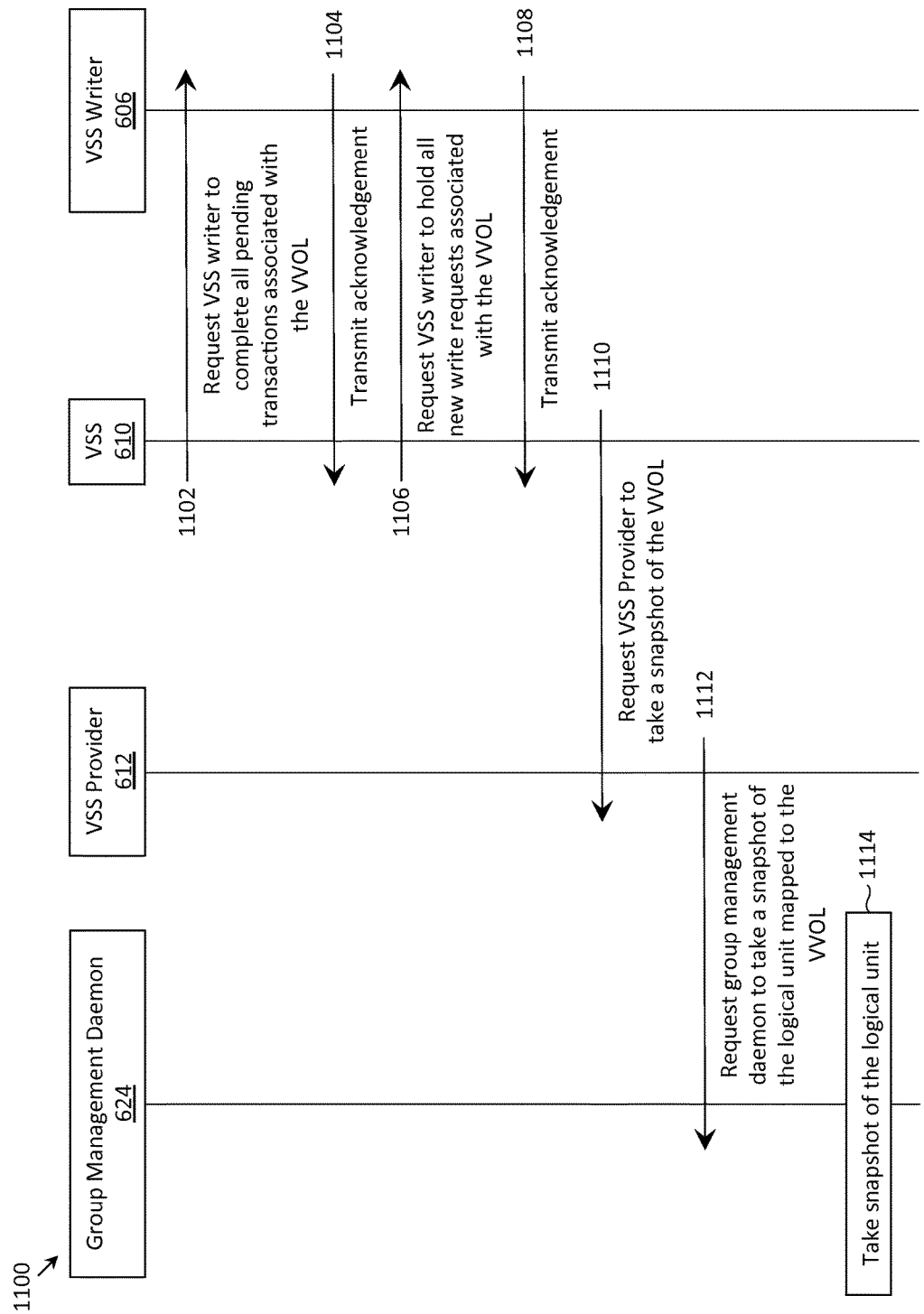
FIGS. 11A-11B depict a sequence diagram of the steps associated the snapshot of a virtual volume, in accordance with one embodiment.
Figure 11B:
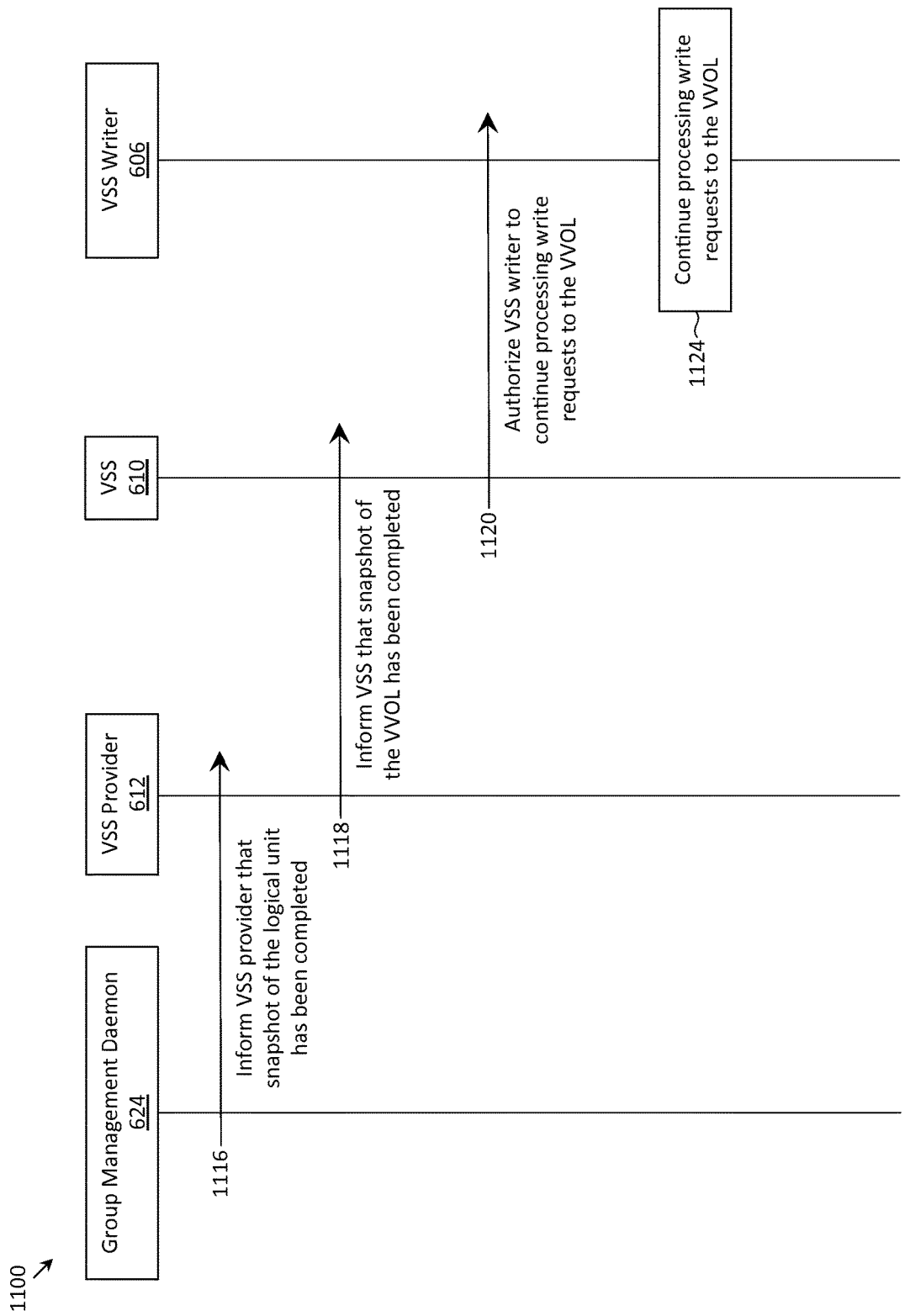

FIGS. 11A-11B depict sequence diagram 1100 which includes steps associated with the snapshot of a VVOL (e.g., VVOL 628), in accordance with one embodiment. For clarity, it is noted that steps 1102, 1104, 1106 and 1108 may be performed between steps 710 and 712 of FIG. 7; step 1110 may correspond to step 712 of FIG. 7; and steps 1112 and 1114 may associated with step 714 of FIG. 7 (e.g., may be performed as part of step 714). In particular, sequence diagram 1100 may be performed in response to VSS provider 612 determining that it supports taking a snapshot of the VVOL (e.g., VVOL 628). At step 1102, VSS 610 may transmit a request to VSS writer 606 which requests VSS writer 606 to complete all pending transactions associated with the VVOL. Once all pending transactions associated with the VVOL have been completed, VSS writer 606 may transmit a message which notifies VSS 610 that all pending transactions associated with the VVOL have been completed. At step 1106, VSS 610 may transmit a request to VSS writer 606 which requests VSS writer 606 to hold all new write requests associated with the VVOL in a queue. Once VSS writer 606 has taken the necessary actions to hold all new write requests associated with the VVOL, VSS writer 606 may transmit a message to VSS 610 which notifies VSS 610 that its request has been completed (step 1108). At step 1110, VSS 610 may transmit a request to VSS provider 612 which requests VSS provider 612 to take a snapshot of the VVOL. At step 1112, VSS provider 612 may transmit a request to group management daemon 624 which requests group management daemon 624 to take a snapshot of the logical unit mapped to the VVOL (i.e., the identifier of the logical unit may be included in the request). Recall, VSS provider 612 may receive the logical unit identifier during step 1006. At step 1114, group management daemon 624 may take a snapshot of the logical unit.

At step 1116 (depicted in FIG. 11B), group management daemon 624 may inform VSS provider 612 that the snapshot of the logical unit has been completed. At step 1118, VSS provider 612 may inform VSS 610 that the snapshot of the VVOL (mapped to the snapshotted logical unit) has been completed. At step 1120, VSS 610 may transmit a message to VSS writer 606 which authorizes VSS writer 606 to continue processing write requests to the VVOL. At step 1124, VSS writer 606 may continue to process write requests to the VVOL.

Figure 12A:
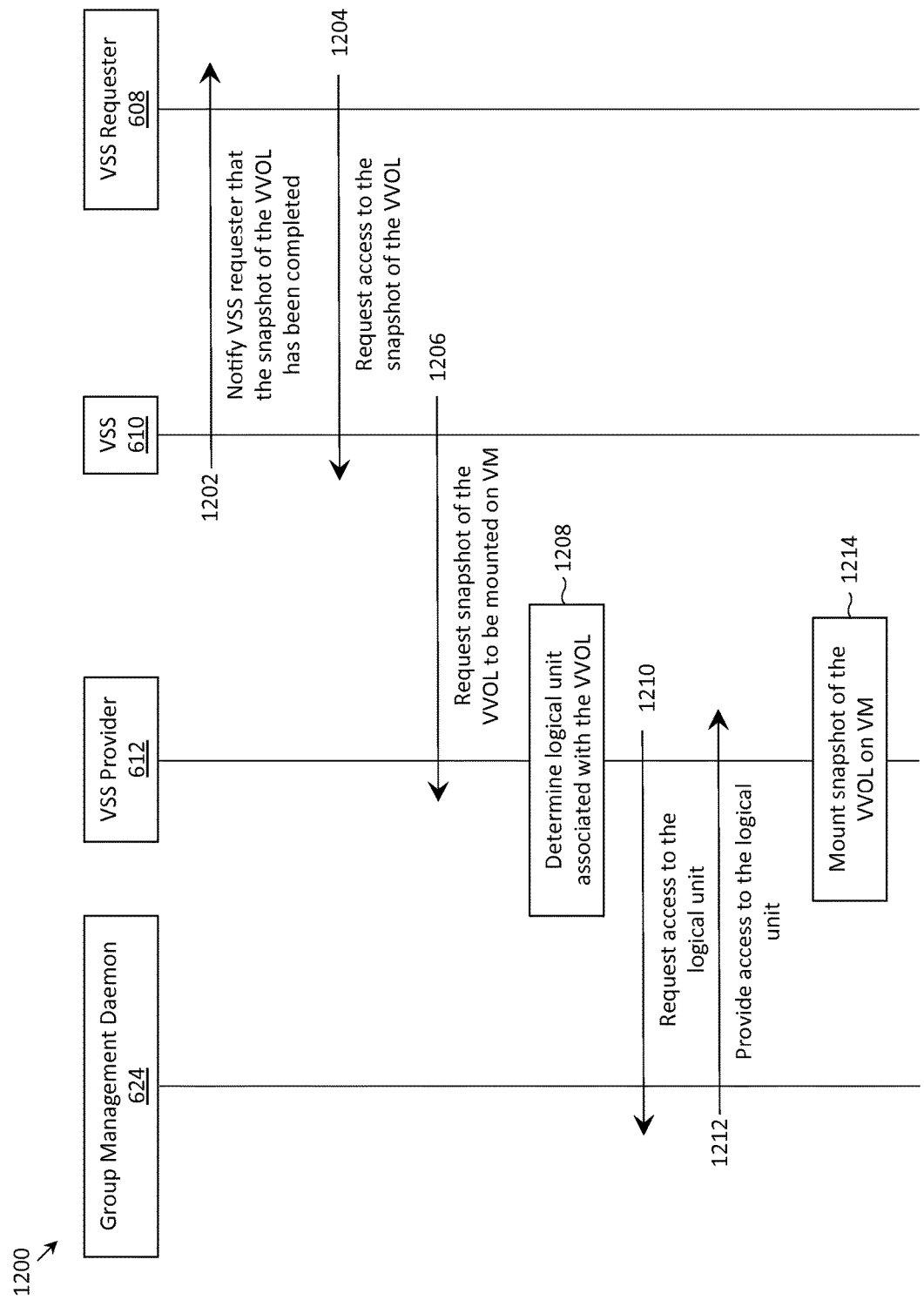
FIGS. 12A-12B depict a sequence diagram of the steps associated with writer post-processing on a virtual volume, in accordance with one embodiment.
Figure 12B:
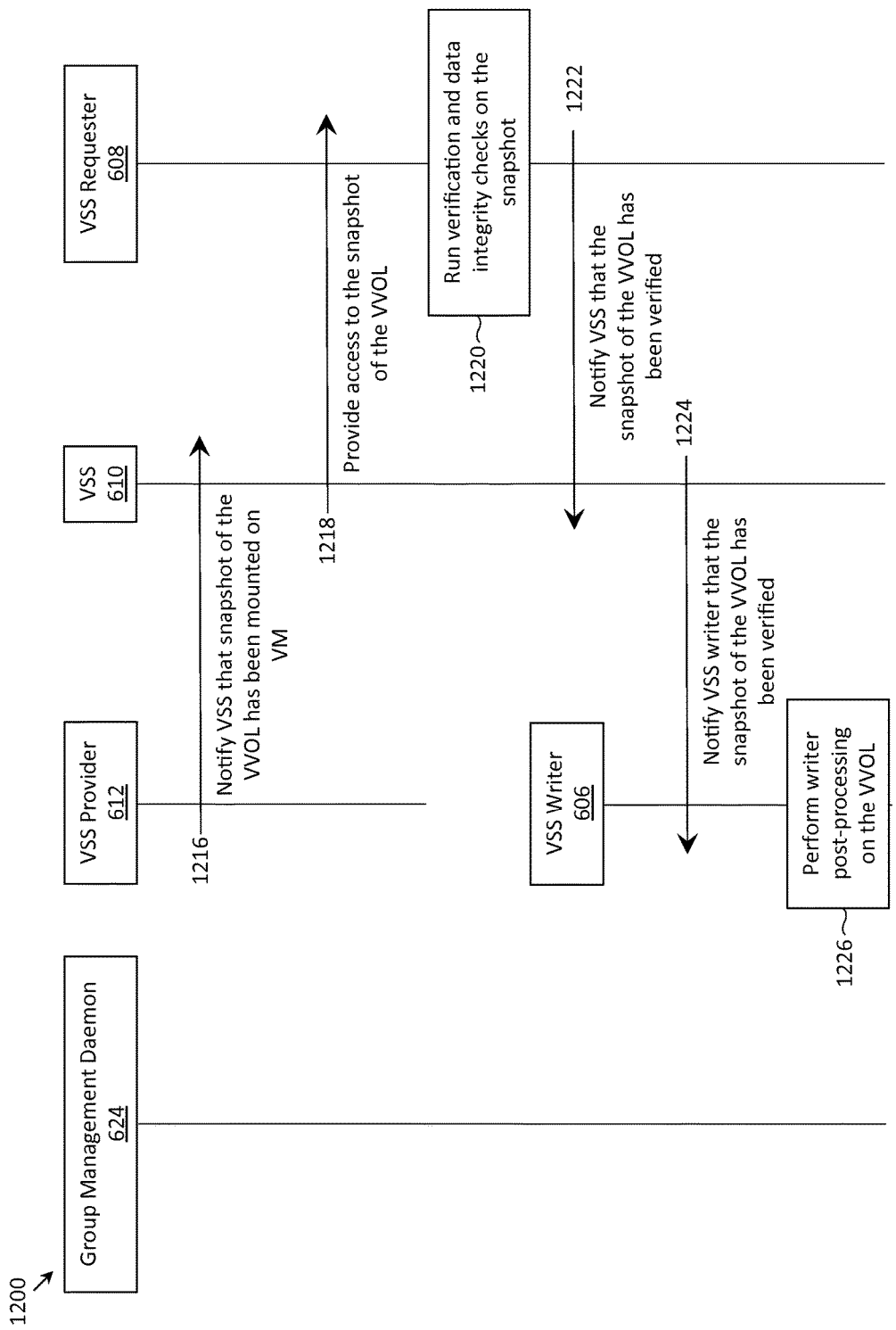

FIGS. 12A-12B depict sequence diagram 1200 which includes steps associated with a process for performing writer post-processing on a VVOL (e.g., VVOL 628), in accordance with one embodiment. For clarity, it is noted that sequence diagram 1200 may be performed immediately after step 1118 of FIG. 11B. At step 1202, VSS 610 may transmit a message to VSS requester 608 which notifies VSS requester 608 that the snapshot of the VVOL has been completed. At step 1204, VSS requester 608 may transmit a request to VSS 610 which requests access to the snapshot of the VVOL. At step 1206, VSS 610 may transmit a request to VSS provider 612 which requests a snapshot of the VVOL to be mounted on VM 604. At step 1208, VSS provider 612 may determine the logical unit associated with the VVOL. As part of step 1208, VSS provider 612 may transmit a request to mapping coordinator 622 (which in turn may access APIs provided by hypervisor manager 640 and/or group management daemon 624) in order to determine the logical unit identifier mapped to the identifier of the VVOL. At step 1210, VSS provider 612 may transmit a request to group management daemon 624 which requests access to the logical unit. At step 1212, group management daemon 624 may provide VSS provider 612 with access to the logical unit. At step 1214, VSS provider 612 may mount the snapshot of the VVOL on VM 604 (e.g., attach the snapshot of the VVOL to VM 604).

At step 1216 (depicted in FIG. 12B), VSS provider 612 may transmit a message to VSS 610 which notifies VSS 610 that the snapshot of the VVOL has been mounted on VM 604. At step 1218, VSS 610 may provide VSS requester 608 with access to the snapshot of the VVOL. At step 1220, VSS requester 608 may run verification and data integrity checks on the data captured in the snapshot of the VVOL. At step 1222, VSS requester 608 may transmit a message which notifies VSS 610 that the snapshot of the VVOL has been verified. At step 1224, VSS 610 may transmit a message which notifies VSS writer 606 that the snapshot of the VVOL has been verified. At step 1226, VSS writer 606 may perform post-processing on the VVOL. For example, a Microsoft Exchange™ writer may truncate Microsoft Exchange™ logs, which includes a record of transactions to the VVOL. As the snapshot of the VVOL has been verified, the transaction history of the VVOL prior to the snapshot may be deleted in order to save space on the VVOL (e.g., the transaction history is no longer needed to reconstruct data on the VVOL since a snapshot of the VVOL has been captured and verified). It is noted that at or after step 1226, VSS provider 612 may also dismount the snapshot of the VVOL (e.g., detach the snapshot of the VVOL from VM 604).

While the description so far has described certain processes that are performed on storage array 618, this is not necessarily so. In another embodiment, such processes may be performed on a device external to storage array 618. For example, while mapping coordinator 622 was instantiated on storage array 618, mapping coordinator 622 could instead by instantiated on host 602. As another example, while the description so far has described storage array 618 (specifically group management daemon 624) transmitting a snapshot request to VSS requester 608, this is not necessarily so. In another embodiment, client device 420 may also transmit a snapshot request to VSS requester 608.

In one embodiment, mapping coordinator 622 could be omitted from storage array 618, and VM 604 could directly communicate with hypervisor manager 640 to obtain mapping information from hypervisor manager 640.

While the description so far has described a snapshot request to request the snapshot of a single VVOL (e.g., VVOL 628), this is not necessarily so. In another embodiment, a snapshot request could request the snapshot of multiple VVOLs (e.g., VVOL 628 and VVOL 634).

While the description so far has described the mapping between VVOL identifiers and logical unit identifiers being maintained by hypervisor manager 640, this is not necessarily so. In another embodiment, this mapping could be maintained by hypervisor 614, storage array 618 and/or another component.

Thus, methods and systems for configuring a VSS requester and VSS provider to operate with VVOLs have been described. It is to be understood that the above-description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method for a virtual machine instantiated on a host, the virtual machine comprising a volume shadow copy service (VSS) framework, the VSS framework including a VSS requester and a VSS provider, the VSS provider associated with a storage array, the method comprising:
   receiving, by the VSS requester, a request to take a snapshot of a first logical unit, the first logical unit identified by a first logical unit identifier;
   transmitting, from the VSS requester to a mapping coordinator instantiated on the storage array, a request to translate the first logical unit identifier into a first virtual volume (VVOL) identifier that identifies a first VVOL which corresponds to the first logical unit, wherein, in response to receipt of the request from the VSS requester, the mapping coordinator accesses a one-to-one mapping between respective VVOL identifiers and respective logical unit identifiers in order to map the first logical unit identifier into the first VVOL identifier and sends the first VVOL to the VSS requester;
   receiving, by the VSS requester from the mapping coordinator, the first VVOL identifier;
   transmitting, from the VSS provider to the mapping coordinator, a request to translate the first VVOL identifier into the first logical unit identifier;
   receiving, by the VSS provider from the mapping coordinator, the first logical unit identifier;
   transmitting, from the VSS provider to the storage array, a request to take a snapshot of the first logical unit as identified by the first logical unit identifier, wherein the storage array takes the snapshot of the first logical unit.

2. The method of claim 1, wherein the snapshot request is received from the storage array.

3. The method of claim 1, wherein a first virtual disk of the virtual machine is stored on the first logical unit, and wherein taking the snapshot of the first logical unit causes a snapshot of the first virtual disk to be taken.

4. The method of claim 3, wherein the first virtual disk stores one or more of structured query language (SQL) data and data belonging to a VSS-aware application.

5. A host device for hosting a virtual machine, the virtual machine including a volume shadow copy service (VSS) framework, the VSS framework including a VSS requester, a VSS writer and a VSS provider, the VSS provider associated with a storage array, the host device comprising:
   a main memory;
   a processor communicatively coupled to the main memory; and
   software instructions on the main memory that, when executed by the processor, cause:
      the VSS requester to receive a request to take a snapshot of a first logical unit, the first logical unit identified by a first logical unit identifier;
      the VSS requester to transmit, to a mapping coordinator instantiated on the storage array, a request to translate the first logical unit identifier into a first virtual volume (VVOL) identifier that identifies a first VVOL which corresponds to the first logical unit, wherein, in response to receipt of the request from the VSS requester, the mapping coordinator accesses a one-to-one mapping between respective VVOL identifiers and respective logical unit identifiers in order to map the first logical unit identifier into the first VVOL identifier and sends the first VVOL identifier to the VSS requester;
      the VSS requester to receive the first VVOL identifier from the mapping coordinator;
      the VSS writer to quiesce an application which stores data on the first VVOL;
      the VSS provider to transmit to the mapping coordinator a request to translate the first VVOL identifier into the first logical unit identifier;
      the VSS provider to receive the first logical unit identifier from the mapping coordinator;
      the VSS provider to transmit to the storage array a request to take a snapshot of the first logical unit as identified by the first logical unit identifier, wherein the storage array takes the snapshot of the first logical unit.

6. The host device of claim 5, wherein the snapshot request is received from the storage array.

7. The host device of claim 5, wherein a first virtual disk of the virtual machine is stored on the first logical unit, and wherein taking the snapshot of the first logical unit causes a snapshot of the first virtual disk to be taken.

8. The host device of claim 7, wherein the first virtual disk stores one or more of structured query language (SQL) data and data belonging to the application.

9. A non-transitory machine-readable storage medium for a host device which hosts a virtual machine, the virtual machine including a volume shadow copy service (VSS) framework, the VSS framework including a VSS requester and a VSS provider, the VSS provider associated with a storage array, the host device comprising a main memory and a processor communicatively coupled to the main memory, the non-transitory machine-readable storage medium comprising software instructions that, when executed by the processor, cause:
   the VSS requester to receive a request to take a snapshot of a first logical unit, the first logical unit identified by a first logical unit identifier;
   the VSS requester to transmit, to a mapping coordinator instantiated on the storage array, a request to translate the first logical unit identifier into a first virtual volume (VVOL) identifier that identifies a first VVOL which corresponds to the first logical unit, wherein, in response to receipt of the request from the VSS requester, the mapping coordinator accesses a one-to-one mapping between respective VVOL identifiers and respective logical unit identifiers in order to map the first logical unit identifier into the first VVOL identifier and sends the first VVOL identifier to the VSS requester;
   the VSS requester to receive the first VVOL identifier from the mapping coordinator;
   the VSS provider to transmit to the mapping coordinator a request to translate the first VVOL identifier into the first logical unit identifier;

the VSS provider to receive the first logical unit identifier from the mapping coordinator;

the VSS provider to transmit to the storage array a request to take a snapshot of the first logical unit as identified by the first logical unit identifier, wherein the storage array takes the snapshot of the first logical unit.

10. The non-transitory machine-readable storage medium of claim 9, wherein the snapshot request is received from the storage array.

11. The non-transitory machine-readable storage medium of claim 9, wherein a first virtual disk of the virtual machine is stored on the first logical unit, and wherein taking the snapshot of the first logical unit causes a snapshot of the first virtual disk to be taken.

12. The non-transitory machine-readable storage medium of claim 11, wherein the first virtual disk stores one or more of structured query language (SQL) data and data belonging to a VSS-aware application.

\* \* \* \* \*